(12) United States Patent
Penha et al.

(10) Patent No.: US 11,010,032 B2
(45) Date of Patent: May 18, 2021

(54) NAVIGATING A HIERARCHICAL DATA SET

(71) Applicant: Citrix Systems, Inc., Fort Lauderdale, FL (US)

(72) Inventors: Priscila K Penha, San Francisco, CA (US); Kelly May Nash, San Mateo, CA (US); Daisuke Sakurai, San Francisco, CA (US); Shih-Hao Yeh, San Francisco, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 299 days.

(21) Appl. No.: 14/187,881

(22) Filed: Feb. 24, 2014

(65) Prior Publication Data
US 2015/0242106 A1 Aug. 27, 2015

(51) Int. Cl.
*G06F 3/0484* (2013.01)
*G06F 3/0481* (2013.01)
*G06F 3/0482* (2013.01)
*G06F 3/0485* (2013.01)

(52) U.S. Cl.
CPC ........ *G06F 3/04847* (2013.01); *G06F 3/0481* (2013.01); *G06F 3/0482* (2013.01); *G06F 3/0485* (2013.01); *G06F 3/04842* (2013.01)

(58) Field of Classification Search
CPC .................. G06F 3/0481; G06F 3/0482; G06F 17/30961; G06F 2203/04805; G06F 2203/04806; G06F 3/0488; G06F 17/30994; G06F 3/04817; G06T 11/206; G06T 13/80; G06T 2200/24; G06N 5/02; G06Q 10/0633; G06Q 10/103; H04L 41/04

USPC ........ 715/810, 819, 820, 834, 854; 707/797, 707/E17.044; 705/7.25
See application file for complete search history.

(56) References Cited

U.S. PATENT DOCUMENTS 5,812,135 A * 9/1998 Kotchey ................. G06F 16/10
715/853
5,877,766 A * 3/1999 Bates .................... G06F 3/0481
715/854

(Continued)

OTHER PUBLICATIONS

International Search Report and Written Opinion for International Application No. PCT/US2014/019005, 10 pages, dated Aug. 7, 2014.

*Primary Examiner* — Arpan P. Savla
*Assistant Examiner* — Maria S Ayad
(74) *Attorney, Agent, or Firm* — Banner & Witcoff, Ftd.

(57) ABSTRACT

Methods, systems, and computer-readable media for providing navigation in a hierarchical data set are presented. In some embodiments, a computing device may generate a user interface including a first node as a focused node at a fixed focal point along with a subset of a first plurality of related nodes having a relationship with the first node. In some instances discussed herein, user input may be received selecting a second node as the focused node, such as a scrolling action dragging the second node to the fixed focal point. The user interface may be updated to display a subset of a second plurality of related nodes having a relationship with the second node. In some arrangements, the hierarchical data set may correspond to an organizational chart, a workflow, a directory structure, a categorized list, a taxonomy, or any other type of hierarchical data.

21 Claims, 8 Drawing Sheets

(56) References Cited

U.S. PATENT DOCUMENTS

| | | | | |
|---|---|---|---|---|
| 6,256,032 B1* | 7/2001 | Hugh | G06F 17/30994 | 707/E17.142 |
| 6,646,652 B2* | 11/2003 | Card | G06F 16/954 | 345/645 |
| 7,203,701 B1* | 4/2007 | Packebush | G06F 17/30961 | |
| 7,299,418 B2* | 11/2007 | Dieberger | G06F 3/0482 | 715/732 |
| 7,343,365 B2* | 3/2008 | Farnham | G06F 3/0481 | 707/737 |
| 8,099,682 B1* | 1/2012 | Konar | G06F 3/0482 | 715/853 |
| 8,332,782 B1* | 12/2012 | Chang | H04L 12/6418 | 707/794 |
| 8,473,868 B1* | 6/2013 | Kauffman | G06F 3/0482 | 715/854 |
| 8,893,032 B2* | 11/2014 | Bruck | G05D 23/1904 | 715/771 |
| 9,223,461 B1* | 12/2015 | Brown | G06F 3/0485 | |
| 2004/0205638 A1* | 10/2004 | Thomas | G06F 3/0482 | 715/273 |
| 2004/0233160 A1* | 11/2004 | Chincholle | G01C 21/20 | 345/156 |
| 2005/0131945 A1* | 6/2005 | Muller | G06F 9/451 | |
| 2006/0271867 A1* | 11/2006 | Wang | G06F 3/0482 | 715/764 |
| 2007/0101364 A1* | 5/2007 | Morita | G06F 3/04817 | 725/38 |
| 2007/0139443 A1* | 6/2007 | Marks | G06F 3/017 | 345/629 |
| 2010/0122215 A1* | 5/2010 | MacGregor | G06F 3/0482 | 715/834 |
| 2011/0138340 A1* | 6/2011 | Holm-Petersen | G06Q 10/06 | 715/854 |
| 2012/0023455 A1* | 1/2012 | Chen | G06F 17/30554 | 715/853 |
| 2012/0113147 A1* | 5/2012 | Virtanen | G06F 3/0482 | 345/650 |
| 2013/0055083 A1* | 2/2013 | Fino | G06F 3/0485 | 715/716 |
| 2013/0151564 A1* | 6/2013 | Brinkman | G06F 17/30961 | 707/797 |
| 2013/0167088 A1* | 6/2013 | Mangum | G06F 3/0485 | 715/815 |
| 2013/0235040 A1* | 9/2013 | Jackson, Jr. | G06T 11/206 | 345/440 |
| 2014/0089851 A1* | 3/2014 | Wielgosz | G06F 3/0482 | 715/810 |
| 2014/0331130 A1* | 11/2014 | Belisle | G06F 3/0482 | 715/705 |
| 2015/0074612 A1* | 3/2015 | Antipa | G06F 3/0482 | 715/854 |

* cited by examiner

NAVIGATING A HIERARCHICAL DATA SET

BACKGROUND

Aspects of the disclosure relate to computer hardware and software. In particular, one or more aspects of the disclosure generally relate to computer hardware and software for navigating a hierarchical data set.

Various kinds of computing devices, from personal computers to mobile devices, are becoming increasingly popular. In addition, people are increasingly using these devices for both business purposes and personal uses. As these devices continue to grow in popularity and people continue to use them for an ever-growing number of reasons, the users of these devices have demanded and will continue to demand greater convenience, functionality, and ease-of-use from their computing devices and the computer software with which they interact.

Hierarchical data sets are one kind of information that users of computing devices may access, and such data sets may be used to represent a wide range of information. For example, a computing device may generate and present a visualization of a hierarchical data set to a user to allow the user to review the elements of the hierarchical data set and the relationships between the elements. In many instances, however, such a hierarchical data set may include many elements, and it may be difficult for the user to navigate the hierarchical data set without being overwhelmed with information.

SUMMARY

Aspects of the disclosure relate to various systems and techniques that provide more convenient, functional, and easy-to-use ways for users to interact with user interfaces provided by computing devices and/or computer software, particularly in instances in which a user is accessing and/or otherwise interacting with a user interface that includes a representation of a hierarchical data set. In addition, certain aspects of the disclosure may provide particular advantages when such a user interface is presented on a mobile device that includes a touch-sensitive display screen, such as a smart phone, tablet computer, or other type of touch-enabled mobile computing device.

For example, some embodiments discussed in greater detail below provide techniques for presenting a user interface including a first node as a focused node at a fixed focal point along with a subset of a first plurality of related nodes having a relationship with the first node. In some instances discussed below, input may be received (e.g., from a user) selecting a second node as the focused node, such as a scrolling action dragging the second node to the fixed focal point. The user interface may be updated to display a subset of a second plurality of related nodes having a relationship with the second node.

By leveraging various aspects of these techniques and/or the other features and functionalities discussed in more detail below, greater convenience, functionality, and ease-of-use may be provided to users wishing to view information stored or organized as part of a hierarchical data set.

Thus, in some embodiments discussed below, a computing device may generate a user interface having a fixed focal point and a content region configured to present one or more nodes representing at least a portion of a hierarchical data set. The one or more nodes may include a first node representing a first element of the hierarchical data set. The processor may update the user interface to present the first node as a focused node at the fixed focal point. The processor may update the user interface to include at least a portion of a first plurality of related nodes that represent a first plurality of elements of the hierarchical data set that are related to the first element.

In some arrangements, the fixed focal point may be maintained at a constant position fixed relative to the content region of the user interface as the first node is moved away from the fixed focal point. A given node may be determined to be the focused node when the given node at least partially overlaps the fixed focal point.

In some arrangements, each of the first plurality of elements may have a parent, sibling, or child relationship to the first element.

In some arrangements, user input may be received moving the first node away from the fixed focal point. Based on receiving the input, the user interface may be updated to include additional nodes of the first plurality of related nodes. In some arrangements, receiving user input may comprise constraining a scrolling action based on the user input to horizontal or vertical scrolling.

In some arrangements, the computing device may detect a selection of a second node of the first plurality of related nodes, where the second node represents a second element of the hierarchical data set. The user interface may be updated to present the second node as the focused node at the fixed focal point. The user interface may be updated to present at least a portion of a second plurality of related nodes instead of the first plurality of related nodes. The second plurality of related nodes may represent a second plurality of elements of the hierarchical data set that are related to the second element. In some arrangements, detecting the selection of the second node may comprise determining that the second node at least partially overlaps the fixed focal point. Detecting the selection of the second node may comprise receiving user input comprising a double click or a double tap on the second node.

In some arrangements, the computing device may receive user input navigating to a sibling node of the first plurality of related nodes. The sibling node may represent a third element of the hierarchical data set having a sibling relationship to the first element. The user interface may be updated to remove a subset of the first plurality of related nodes representing one or more elements having a child relationship to the first element. The user interface may be updated to present the sibling node as the focused node at the fixed focal point. The user interface may be updated to present at least a portion of a third plurality of related nodes representing a third plurality of elements of the hierarchical data set that are related to the third element.

In some arrangements, the method may comprise determining that at least one node of the first plurality of related nodes has one or more children when the at least one node represents an element of the hierarchical data set having one or more child elements. Based on determining that the node has one or more children, the user interface may be updated to include at least one child indicator on the node.

In some arrangements, an appearance of a particular node included in the user interface may be determined according to content of an element of the hierarchical data set represented by the particular node. The appearance may be determined according to data type, hierarchy level, number of children, and the like.

In some arrangements, the hierarchical data set may correspond to an organizational chart, a workflow, a directory structure, a categorized list, a taxonomy, or any other type of hierarchical data.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, certain embodiments are discussed herein that relate to providing user interfaces for navigating hierarchical data sets. Before discussing these concepts in greater detail, however, several examples of a computing device that may be used in implementing and/or otherwise providing various aspects of the disclosure will first be discussed with respect to FIG. 1.

Figure 1:
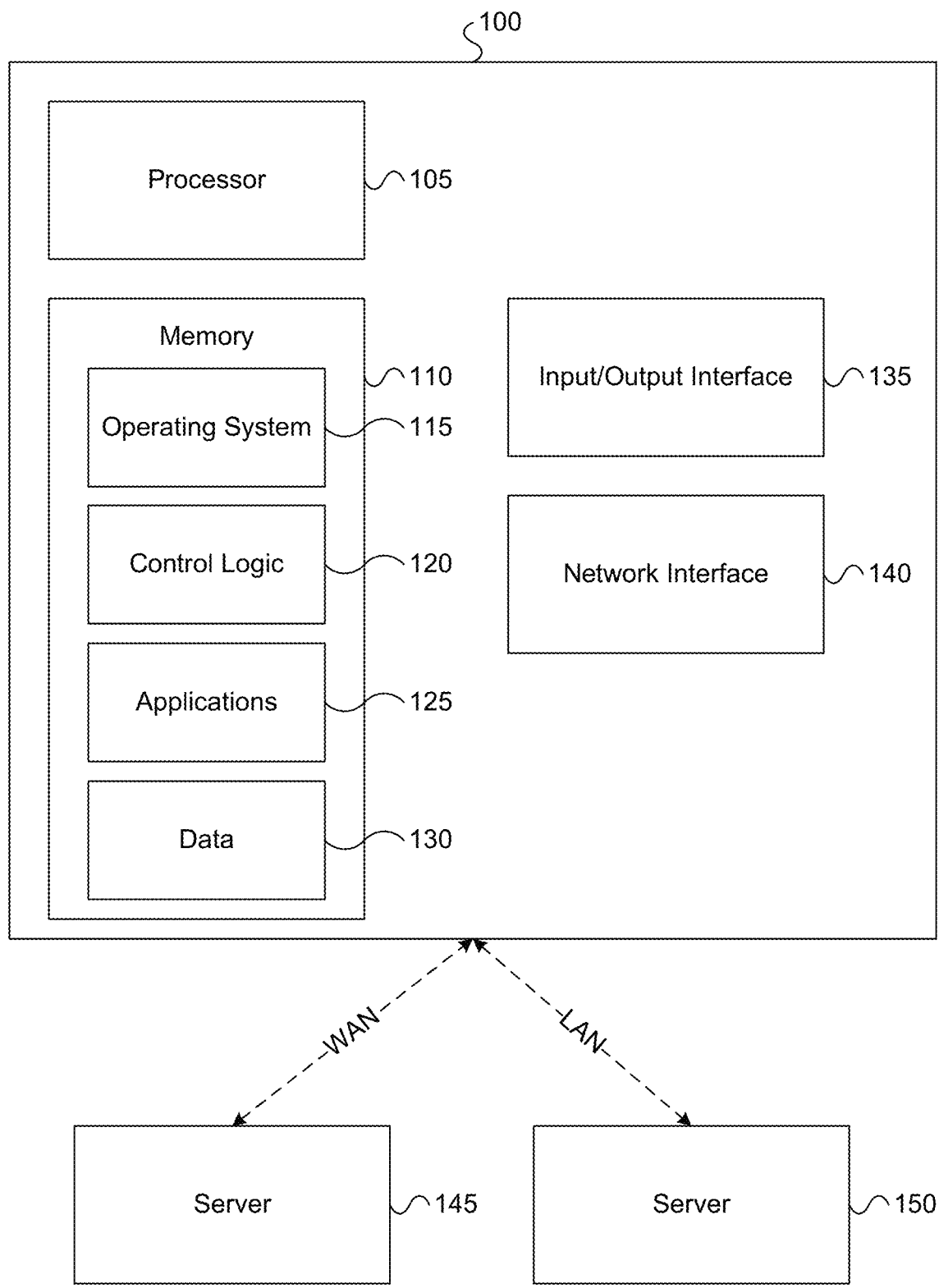
FIG. 1 depicts an example of a computing device that may be used in implementing one or more aspects of the disclosure in accordance with one or more illustrative aspects discussed herein.

FIG. 1 depicts an example of a computing device 100 that may be used in implementing one or more aspects of the disclosure in accordance with one or more illustrative aspects discussed herein. For example, computing device 100 may, in some instances, implement one or more aspects of the disclosure by reading and/or executing instructions and performing one or more actions accordingly. In one or more arrangements, computing device 100 may represent, be incorporated into, and/or include a desktop computer, a computer server, a mobile device (e.g., a laptop computer, a tablet computer, a smart phone, any other type of mobile computing device, etc.), and/or any other type of data processing device. Computing device 100 may, in some instances, operate in a standalone environment. In other instances, computing device 100 may operate in a networked environment. For example, computing device 100 may, in some instances, be connected to and/or otherwise in communication with one or more other computing devices that may be local to and/or physically remote from computing device 100.

As seen in FIG. 1, computing device 100 may, in some embodiments, include a processor 105, memory 110, an input/output interface 135, and a network interface 140. These are only some examples of the components and/or subsystems that may be included in computing device 100 in some embodiments. In other embodiments, computing device 100 may include two or more of any and/or all of these components (e.g., two or more processors, two or more memories, etc.) and/or other components and/or subsystems not listed here.

In some embodiments, processor 105 may control overall operation of computing device 100, including operation of one or more of the other components included in computing device 100, such as memory 110, input/output interface 135, and/or network interface 140. Memory 110 may, for instance, store software, instructions, data, and/or other information. For example, software may be stored in memory 110 and/or other storage to provide instructions to processor 105 for configuring the generic computing device 100 into a special purpose computing device in order to perform one or more of the various functions discussed herein.

In some arrangements, memory 110 may store, provide, and/or otherwise include an operating system 115, control logic 120, one or more applications 125, and/or data 130. Operating system 115 may, for example, control overall operation of computing device 100. Control logic 120 may, for instance, instruct computing device 100 and/or various components included therein, including processor 105, to perform and/or otherwise provide various aspects of the disclosure. The one or more applications 125 may, for example, provide secondary, support, and/or other functionalities that may be used in conjunction with various aspects of the disclosure. Additionally, data 130 may, for instance, be used in performing one or more aspects of the disclosure and, in some instances, may include one or more databases, data tables, and/or the like.

In some arrangements, input/output interface 135 may include a keyboard, mouse, display, printer, scanner, optical reader, stylus, and/or one or more other components. For example, input/output interface 135 may include various interface units and/or drives for reading, writing, displaying, and/or printing files and/or other data. In some embodiments, input/output interface 135 may include an audio interface that includes one or more microphones for capturing audio input and/or one or more speakers for providing audio output. Additionally or alternatively, input/output interface 135 may include a video display device for providing textual, audiovisual, and/or graphical output.

In some embodiments, at least one display included in and/or otherwise provided by input/output interface 135 may be a touch-sensitive display screen (also known as a "touch screen"). Such a touch screen may, for instance, be configured to display graphical content rendered and/or otherwise generated by computing device 100. In addition, the touch screen may be configured to receive user input from a user of computing device 100, including touch-based user input provided by the user using a stylus, finger, or other pointing aspect that is operated, controlled, and/or otherwise used by the user of the computing device 100 to interact with the touch screen.

As indicated above, computing device 100 may, in some instances, operate in a networked environment supporting connections to one or more remote computers, servers, and/or devices. Such connectivity may, in some embodiments, be provided by network interface 140. For example, network interface 140 may include one or more communication interfaces, ports, adapters, antennas, and/or other elements to facilitate various network connections. Such network connections may include local area network (LAN) connections, wide area network (WAN) connections (e.g., to the Internet), and/or any other types of connections. In some arrangements, LAN connections may be established and/or provided via a dedicated LAN interface and/or adapter, and/or WAN connections may be established and/or provided via a dedicated WAN interface and/or adapter. Other connections may, for example, be established and/or provided via other communication interfaces, such as wired communication interfaces (e.g., Ethernet), wireless communication interfaces (e.g., wireless LAN (WLAN), cellular, Bluetooth, etc.), and/or other communication interfaces.

As seen in FIG. 1, computing device 100 may, in some instances, be connected to and/or in communication with one or more servers, such as server 145 and server 150. Such servers may, for instance, implement one or more aspects of computing device 100 and, accordingly, may include one or more processors, memories, and/or the like. Some connections to the one or more servers may be established via a LAN (e.g., the connection between computing device 100 and server 145), while other connections to the one or more servers may be established via a WAN (e.g., the connection between computing device 100 and server 150). In some embodiments, some or all of the one or more servers may be virtual servers that are provided by software being executed on one or more computing devices.

In addition, one or more aspects of the disclosure may be embodied in computer-usable or readable data and/or computer-executable instructions, such as in one or more program modules, executed by one or more computers or other devices as discussed herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as discussed herein may be transferred between a source and a destination in the form of electromagnetic waves traveling through signal-conducting media such as metal wires, optical fibers, and/or wireless transmission media (e.g., air and/or space). Various aspects discussed herein may be embodied as a method, a data processing system, or a computer program product. Therefore, various functionality may be embodied in whole or in part in software, firmware, and/or hardware or hardware equivalents such as integrated circuits, field programmable gate arrays (FPGA), and the like. Particular data structures may be used to more effectively implement one or more aspects of the disclosure, and such data structures are contemplated as being within the scope of computer executable instructions and computer-usable data discussed herein.

Further, some aspects of the disclosure may also be operational with numerous other general purpose or special purpose computing system environments or configurations. Examples of other computing systems, environments, and/or configurations that may be suitable for use with aspects discussed herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Having discussed several examples of the computing system architecture that may be used in providing and/or implementing various aspects of the disclosure, a number of embodiments will now be discussed in greater detail. In particular, and as introduced above, some aspects of the disclosure generally relate to providing user interfaces for navigating hierarchical data sets. In the description below, various examples illustrating how such user interfaces may be provided in accordance with one or more embodiments will be discussed.

A hierarchical data set may include a collection of data elements and relationships between the data elements. The hierarchical data set may be organized in a tree-like data structure, utilizing parent-child relationships. Each element of the hierarchical data set may have zero, one, or multiple children elements. In some embodiments, the hierarchical data set may be organized according to a single hierarchy such that a given element may either have only one parent or it may be a root element that has no parent. In other embodiments, the hierarchical data set may be multi-hierarchical such that a given element may have multiple parents.

In one or more embodiments, a hierarchical data set may be used to store information regarding entities and their relationships to one another. For example, the hierarchical data set may be an organizational chart that contains information regarding the structure of an organization and the relationships and/or relative ranks between positions or business units within the organization. In other embodiments, the hierarchical data set may represent items or other logical objects and components thereof. For example, the hierarchical data set may be a file directory system where subfolders or files in a folder are children of that folder. Or, as another example, an element of a hierarchical data set may correspond to a particular task in a workflow and children of that element may be steps or component tasks of the particular task. In still other embodiments, the hierarchical data set may store information regarding containers or labels and the membership thereof. For example, the hierarchical data set may be a categorized directory of products or may be a taxonomy of items, or the hierarchical data set may represent a multiple taxonomy of items in which an item may have more than one parent. Hierarchical data sets may be used to represent any type of data elements having parent-child or similar relationships, and aspects discussed herein may be utilized in any such application.

As noted above, elements of a hierarchical data set may have relationships to other elements in the hierarchical data set. These relationships may be used to convey information regarding the organization, structure, nature, and/or content of the hierarchical data set. In some embodiments, the relationships may be characterized as parent, sibling, or child relationships. For example, a first node may have a parent relationship to a second node when the first node is located above the first in the hierarchy and related to the second node, that is, the first node is the parent of the second node. Similarly, the second node may have a child relationship to the first node when the second node is located below the first in the hierarchy and the two nodes are related, that is, the second node is the child of the first node. A first node may have a sibling relationship to a second node when the first and second nodes are both children of a common parent node and at the same level in the hierarchy. In other embodiments, the relationships between elements may be other than parent/sibling/child, such as where the relationships indicate an interaction, order, and/or other association between elements, and the like. In some embodiments, the relationships may have a directional component indicating a direction associated with an information or process flow represented by the relationship. The directional component may be one-direction, indicating a one way flow, or may be bidirectional, indicating a two-way relationship. In other embodiments, the relationships might not have a directional component.

In some embodiments, a hierarchical tree view may be constructed from the hierarchical data set in order to visualize the elements and their relationships. In the tree view, the hierarchical data set may be represented as a tree comprised of nodes and branches. The nodes may each represent an element of the hierarchical data set, or they may represent attributes, content, or functions related to the element. A visual indication of the node may be determined based on a generic node indicator, or may be determined based on the content of the element represented by the node. For example, the node may be displayed with a shape, title, text, image, color, style, and/or other display attribute based on the content of the element. As an example, a node representing an element in an organizational chart may be displayed with a picture of a person corresponding to the element. In some embodiments, the visual indication of the node may be determined based on the context in which it is displayed, such as application context, user preferences, content of other displayed nodes, and the like.

In some arrangements, the branches illustrated in the tree view of the hierarchical data set may represent a relationship between two or more nodes. The nature of the relationship may be represented through a display aspect of the branch, such as an arrow indicating a parent-child relationship, and/or through a relative placement or layout of the nodes and branches, such as where a parent node appears located above a child node. Alternatively or additionally, the nature of the relationship may be conveyed through a display aspect of the node, such as where a parent node is displayed. In some embodiments, branches might not be displayed and, instead, a relative placement of the nodes or differences in display attributes of the nodes may indicate the relationships. The tree view may be presented on a user interface and may provide users with an understanding of the content and organization of the hierarchical data set. The tree view may also allow users to navigate within the hierarchical data set and view details of individual elements.

Figure 2:
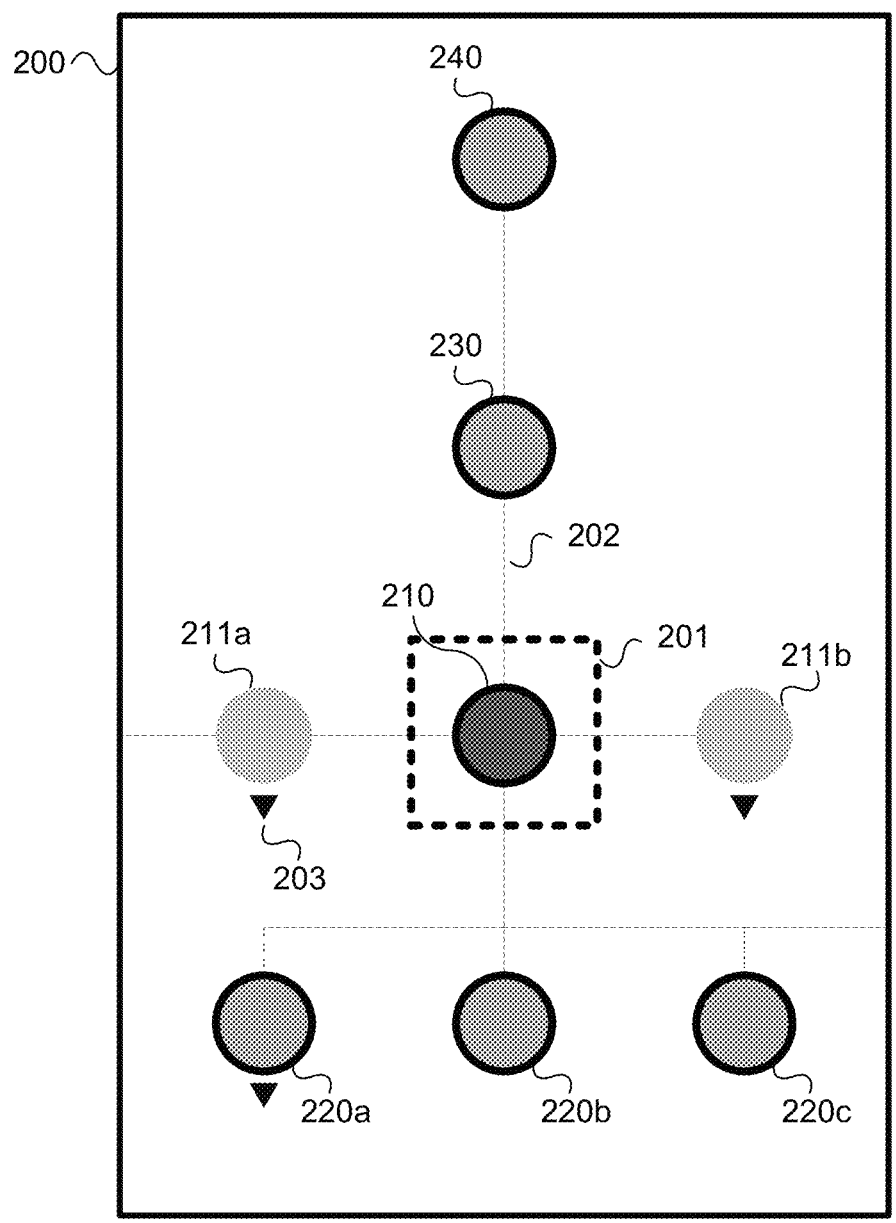
FIG. 2 depicts an example user interface that includes a representation of a hierarchical data set in accordance with one or more illustrative aspects discussed herein.

FIG. 2 illustrates an example user interface 200 presenting a plurality of nodes (e.g., selected node 210) arranged in a tree view. Each of the plurality of nodes may represent an element of a hierarchical data set. User interface 200 includes fixed focal point 201. As illustrated in FIG. 2, fixed focal point 201 may be a region of user interface 200 which is used to identify a currently focused node, shown as focused node 210. Also included on user interface 200 is a plurality of other nodes related to the currently focused node. These include parent node 230 and grandparent node 240. Parent node 230 may be a parent of focused node 210, and grandparent node 240 may be a parent of parent node 230. Also included are sibling nodes 211a and 211b, which share a common parent node (e.g., parent node 230) with focused node 210. Further included are children nodes 220a, 220b, and 220c which are children of focused node 210. User interface 200 also includes branches (e.g., branch 202) to indicate relationships between the nodes. In some embodiments, the branches might not be included in the user interface and/or the relationships between the nodes may instead be indicated by relative placement and/or other display aspects of the nodes. In some embodiments, user interface 200 may include child indicator 203 which is shown on a node (e.g., sibling node 211a) to indicate that the node has child nodes below it. The child indicator 203 may be shown in lieu of displaying children of nodes other than focused node 210. According to some embodiments, a user may interact with a node contained in user interface 200 to view additional details or actions associated with the node.

As illustrated in FIG. 2, user interface 200 may present a limited view of the hierarchical data set in that nodes corresponding to only a subset of the hierarchical data set may be included in the user interface 200. In addition, the nodes that are included in the visualization of the hierarchical data set might only include nodes having a relationship to focused node 210. A first node may be considered related to a second node when the element of the hierarchical data set represented by the first node has a relationship to the element or content represented by the second node. In one or more embodiments, the visualization presented in the user interface 200 may thus include a subset of all the nodes related to focused node 210. In some instances, the computing device generating the user interface 200 may select one or more nodes for inclusion in the user interface 200 based on available screen space, user attention, device capabilities and resources, application context, user preferences, and the like. For example, user interface 200 may be adapted for display on a small form-factor device such as a mobile device. In such a case, a smaller subset of the nodes related to focused node 210 may be selected for display in order to provide the user with readable information. In another example, user interface 200 may be adapted for presentation on a wide-screen device, and a larger subset or all of the related nodes may be displayed. The computing device may further base the selection of the nodes to include in the subset of related nodes on an ordering of the related nodes, attributes of the related nodes, attributes of the focused node, predictive algorithms, user preferences, and the like. As discussed further below, user interface 200 may allow a user to navigate throughout the entire set of related nodes, as well as throughout the entire hierarchical data set.

According to some aspects discussed herein, the visualization presented (e.g., by the computing device) may omit, suppress, or otherwise not include other nodes lacking a relationship to focused node 210. For example, in user interface 200 as illustrated, child indicator 203 is displayed in lieu of children of sibling node 211a. An appearance of child indicator 203 may be varied based on node content, context, number of children, user preferences, or any other criteria related to the hierarchical data set or the application. In one embodiment, a node has a relationship to focused node 210 if it represents an element that has a parent, child, or sibling relationship to the element represented by focused node 210. In other embodiments, this may be expanded to include grandparent, grandchildren, ancestors, descendants, or any other type of relationship as may be desired. Omitting the display of other nodes not related to focused node 210 may, for instance, allow for the display of more relevant information related to focused node 210. Display of nodes may be suppressed (e.g., by the computing device) based on relationship to focused node 210, distance from focused node 210, attributes of focused node 210, attributes of other nodes, and the like. By providing a limited visualization of the hierarchical data set, some aspects discussed herein may allow a user to better view and navigate within the hierarchical data set. Limiting the number of parent generations shown, for instance, may allow for more detailed child nodes to be displayed, giving a better indication of the components or subordinate items of focused node 210. Conversely, limiting the number of child generations shown may allow for more parent nodes to be displayed, lending more context to focused node 210.

In one or more embodiments, fixed focal point 201 may serve to identify the currently focused node. As discussed above, display of other nodes on user interface 200 may be limited to nodes having a relationship to focused node 210, or a subset thereof. Fixed focal point 201 may be a region designated as corresponding to the focus of the application and may serve as a means of navigating the hierarchical data set according to aspects disclosed herein. A node located within, overlapping, or on fixed focal point 201 may be designated as the focused node, and user interface 200 may be updated to display nodes related to the focused node located within fixed focal point 201. Additional details may be provided on user interface 200 regarding the element of the hierarchical data set represented by the focused node.

Fixed focal point 201 may be fixed relative to a content region of user interface 200. User interaction may be received (e.g., by the computing device) to navigate throughout the hierarchical data set and may result in the displayed nodes being moved within the content region. The fixed focal point 201 may be maintained at a constant position as focused node 210 is moved away from fixed focal point 201, for instance, as a result of the user interaction. A new node moved at least partially into or over fixed focal point 201 may become the new focused node, as discussed further below. The fixed focal point 201 may be located near (e.g., within a predetermined distance of) a top, center, or bottom of the content region, or any desired location. The location may be determined by user preference or setting. In some embodiments, the location may be predetermined based on considerations related to device attributes, display attributes, or application context. For example, in instances in which a smartphone is used to present user interface 200, fixed focal point 201 may be located centrally in the lower third of the display in order to allow the user to provide input navigating through the hierarchical data set using only one hand and/or one thumb.

A visual indicia corresponding to fixed focal point 201 may be included on user interface 200, such as the square presented in FIG. 2. Fixed focal point 201 may be presented with any appropriate visual indicia, such as a square, a circle, a target, a star, partial outline, and the like. Alternatively, user interface 200 may provide no visual indication of fixed focal point 201 and a user may discern its location through operation of user interface 200. Through use of fixed focal point 201, according to some aspects disclosed herein, a user may intuitively navigate throughout a hierarchical data set and retrieve information as required. Fixed focal point 201 may suggest to the user that the displayed data relates to focused node 210, and as a result is relevant to that node. Further, fixed focal point 201 may be adapted to provide quick, easy, and clear navigation through a hierarchical data set to users of mobile devices which may have limited screen space, input capabilities, and specialized applications.

Figure 3:
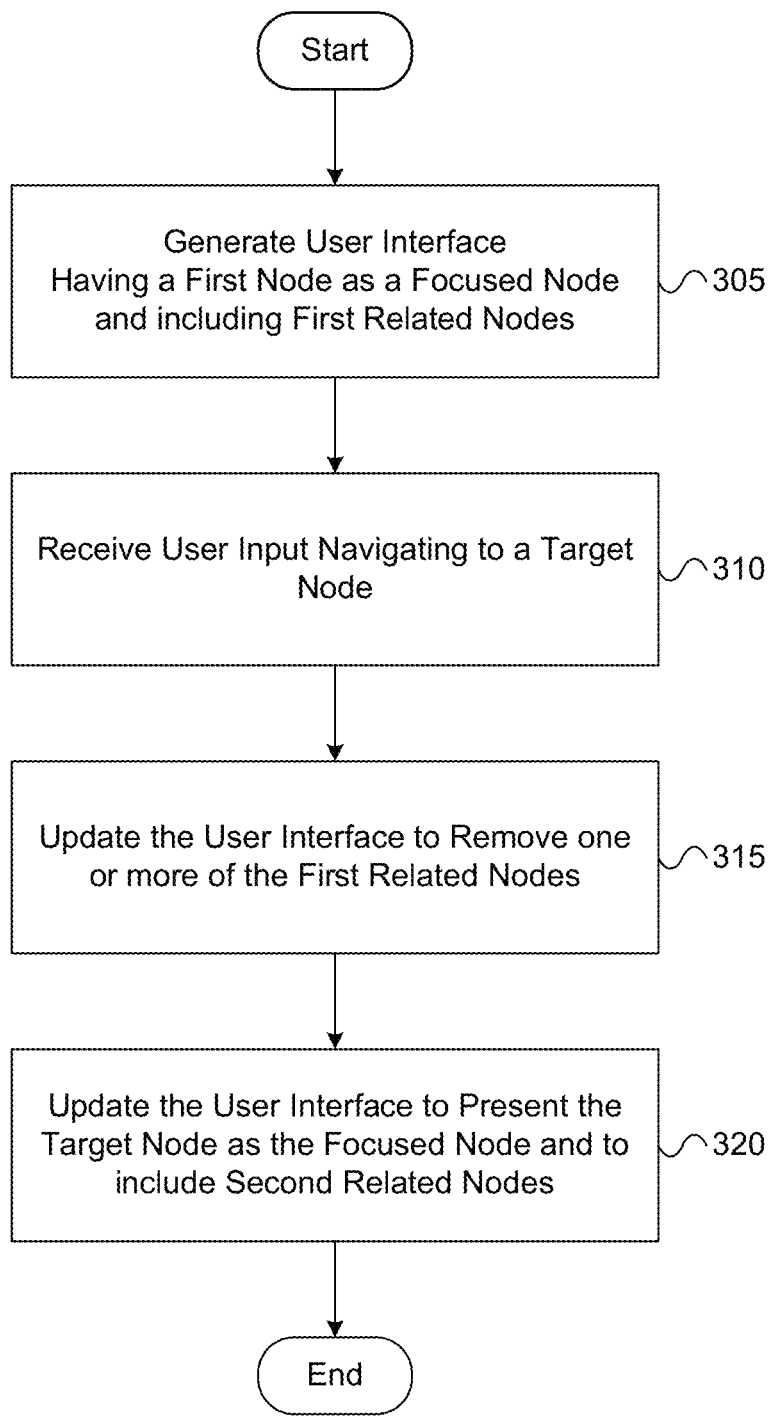
FIG. 3 depicts a flowchart that illustrates a method of providing a navigational user interface in accordance with one or more illustrative aspects discussed herein.

Having discussed a user interface according to FIG. 2, discussion will now turn to a method of navigating throughout the visualization of the hierarchical data set as shown in FIG. 3.

FIG. 3 depicts a flowchart that illustrates a method of providing a user interface for navigating a hierarchical data set in accordance with one or more illustrative aspects discussed herein. In one or more embodiments, the method illustrated in FIG. 3 and/or one or more steps thereof may be performed by a computing device (e.g., generic computing device 100). Additionally or alternatively, the method illustrated in FIG. 3 and/or one or more steps thereof may, in some instances, be performed by a mobile device (which may implement one or more aspects of a computing device, such as generic computing device 100). In other embodiments, the method illustrated in FIG. 3 and/or one or more steps thereof may be embodied in computer-executable instructions that are stored in a computer-readable medium, such as a non-transitory computer-readable memory.

As seen in FIG. 3, the method may begin at step 305 in which a user interface may be generated having a first node as the focused node and including a subset of a first set of related nodes. For example, in step 305, a computing device executing the method illustrated in FIG. 3 (e.g., computing device 100) may generate and/or display a graphical user interface. The user interface generated in step 305 may be similar to user interface 200 (FIG. 2), for instance, with the first node being node 210 located at fixed focal point 201 and the first related nodes including nodes 211a, 211b, 220a, 220b, 220c, 230, and 240. The nodes in the user interface may be generated based on elements of the hierarchical data set, including a first element corresponding to the focused node and elements related to the first element corresponding to the first set of related nodes.

In step 310, the computing device (e.g., computing device 100) may receive user input navigating to a target node. For example, the computing device may receive such user input via a mouse, touch screen, and/or the like. The user input navigating to a target node may include a selection of the target node as the new focused node. In one embodiment, the user input may include input causing the target node to at least partially overlap a fixed focal point displayed on the user interface, thereby designating the target node as the new focused node. For example, the user input may be a scrolling motion performed on the user interface to move within a displayed representation of the hierarchical data set. In some embodiments, the scrolling motion may include a swipe, slide, or flick of a user's fingers, stylus, or other input received by a touch screen included in and/or connected to the computing device. Additionally and/or alternatively, the scrolling motion may include, for example, input received from a mouse such as directional movement or operation of a scrolling control. Similarly, the scrolling motion may include operation of a designated key of a keyboard or other input device. In some embodiments, the computing device may wait for an end of the scrolling motion before determining whether the target node at least partially overlaps the fixed focal point. In other embodiments, the user input may include a double tap/click or other appropriate input to directly select a node as the new focused node. Receiving user input via the user interface is further discussed below in regard to FIGS. 4A-B.

Figure 4C:
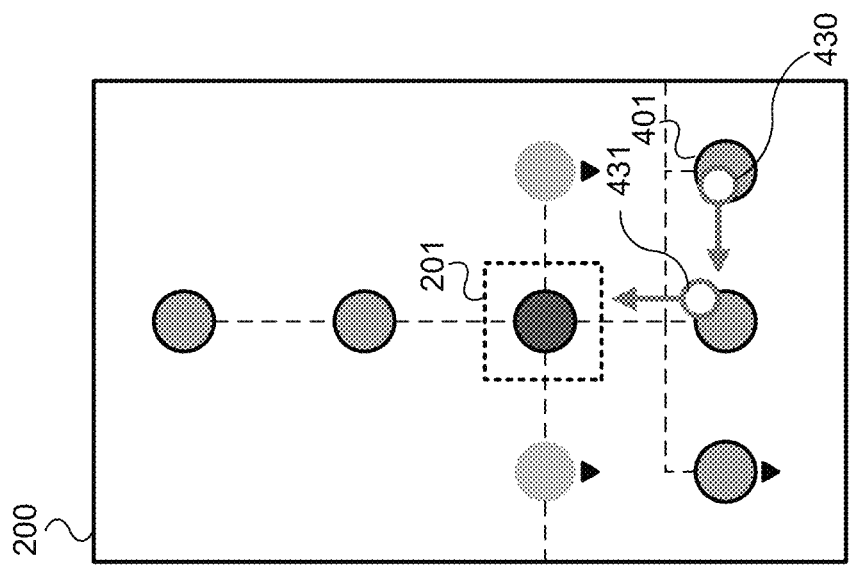
FIGS. 4A-4C depict example user interfaces as well as illustrative user input in accordance with one of more aspects discussed herein.
Figure 4B:
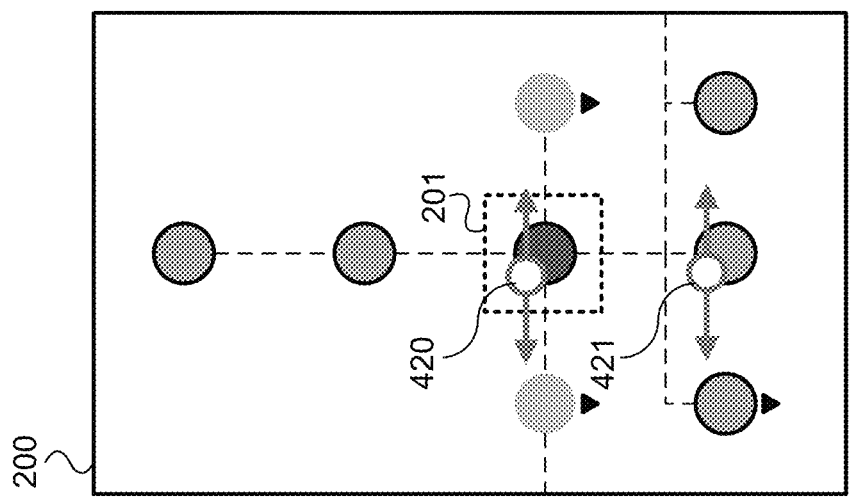
Figure 4A:
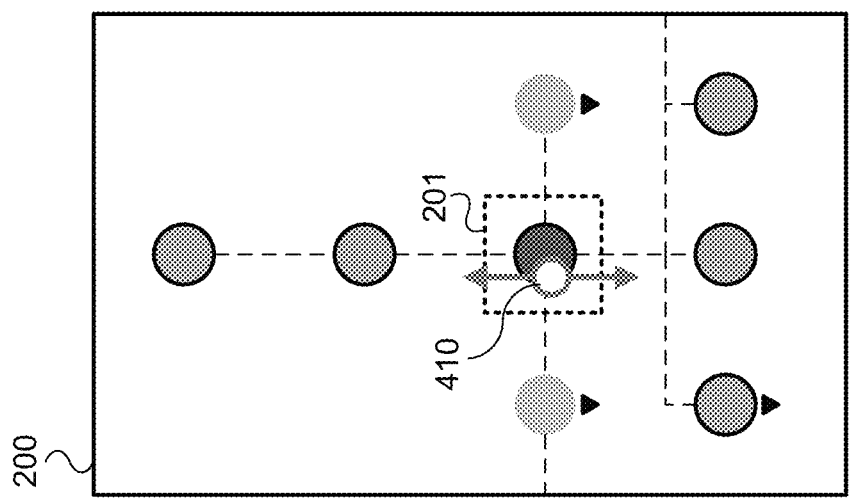

FIG. 4A illustrates an example of the user input which may be received in step 310. In particular, the user input received in step 310 may be a vertical scrolling motion 410. In one example, vertical scrolling motion 410 may correspond to a user tapping a touch screen associated with the computing device and moving his finger in an up or down direction. Such a motion may have an effect of moving up or down in the visualization of the hierarchical data set. For instance, if the user tapped and moved upwards, the computing device may illustrate the nodes of the visualization as being dragged higher in a content region of user interface 200. If the effect of vertical scrolling motion 410 is to drag a node such that it at least partially overlaps fixed focal point 201, the computing device may select the node as the new focused node. Similarly, if the user tapped and moved downwards, the computing device may illustrate the nodes of the visualization as being dragged lower in the content region and a new focused node may be selected. Dragging a node may cause other nodes related to that node to also be moved.

FIG. 4B illustrates another example of the user input which may be received in step 310. In the example illustrated in FIG. 4B, the user input received in step 310 may be horizontal scrolling motions 420 or 421. In one example, horizontal scrolling motions 420 or 421 may correspond to a user tapping a touch screen associated with the computing device and moving his finger in a left or right direction. Such a motion may have an effect of moving throughout a set of nodes having a given relationship to the focused node or a set of nodes displayed at a given level of the hierarchical data set. In addition, the computing device may determine the nodes affected by the scrolling motion based on a start position of the motion. For instance, horizontal scrolling motion 420 may cause the computing device to move between sibling nodes of the focused node. Similarly, horizontal scrolling motion 421 may cause the computing device to move between children nodes of the focused node. Similar to vertical scrolling motion 410 (FIG. 4A), if the effect of horizontal scrolling motion 420 is to drag a node such that it at least partially overlaps fixed focal point 201, the computing device may select the node as the new focused node.

As discussed above, the computing device generating user interface 200 may limit the display of the nodes representing the hierarchical data set to a subset of nodes related to the focused node. As part of processing vertical scrolling motion 410, horizontal scrolling motions 420 and 421, or any other scrolling motions, user interface 200 may be updated to show additional nodes of the nodes related to the focused node or the newly focused node and/or remove other nodes. For example, scrolling motion 421 may cause additional children of the focused node to be displayed (e.g., by the computing device) and may cause others to be removed. For instance, a left scroll motion may cause additional nodes to appear from the right side of user interface 200 and may cause some of the displayed nodes to be removed as they approach or cross the left side of user interface 200.

In some embodiments, user input corresponding to scrolling motions may be limited to substantially horizontal and/or vertical motions. For example, the computing device may constrain a scrolling motion received as user input by interpreting and/or acting on the scrolling motion as if it were either a purely horizontal or vertical scroll command. Various techniques may be employed to determine whether user input substantially corresponds to horizontal or vertical motion, such as threshold ratios of X and Y components of the motion, for example. These constraints on user navigation may be adapted for use in navigating the relationships between elements of the hierarchical data set and in some embodiments may correspond to directions of the relationships as displayed on user interface 200. In other embodiments, user input corresponding to scrolling motions may be constrained to diagonal motions, curved motions, patterns, gestures, and the like, or any combination thereof. In still other embodiments, user input corresponding to scrolling motions might not be so limited, and a user may instead be able to freely scroll throughout the visualization.

FIG. 4C illustrates an example of how scrolling motions can be combined to navigate to target node 401, which is a child of the currently focused node. A first scrolling motion 430 may be received when a user taps a touch screen of the computing device and drags his finger to the left, as indicated by the arrow. The effect of this motion may be to drag target node 401 towards the center of user interface 200. As a result, additional children may be displayed originating at the right side of user interface 200, and one or more displayed children may be removed as they approach or cross the left side of user interface 200. Second scrolling motion 431 may then be received when the user taps the screen again and drags his finger up, as indicated by the arrow. Alternatively, the user's finger may maintain contact with the screen and the user may simply drag his finger up after dragging it to the left. The effect of this motion may be to drag target node 401 into fixed focal point 201, which may designate target node 401 as the new focused node.

Returning to FIG. 3, in step 315, the computing device (e.g., computing device 100) may remove one or more of the first set of related nodes in response to the user input navigating to the target node. As discussed above, the computing device may update the user interface to show additional nodes of the nodes related to the focused node or the target node and/or remove other nodes. For example, a right scrolling motion may navigate to a sibling of the focused node, and may cause additional sibling nodes to be displayed and/or cause others to be removed. In some embodiments, where the user input navigating to the target node comprises user input selecting the target node as a new focused node, the computing device may update the user interface to remove those nodes related to the previously focused node but not related to the new focused node. Nodes related to both the previously focused node and the new focused node, such as common parents or siblings, may be maintained on the user interface.

In step 320, the computing device may update the user interface to present the target node as the focused node and to include a portion of a second set of related nodes. The second set of related nodes may correspond to elements of the hierarchical data set having a relationship to the element represented by the target node.

Figure 5C:
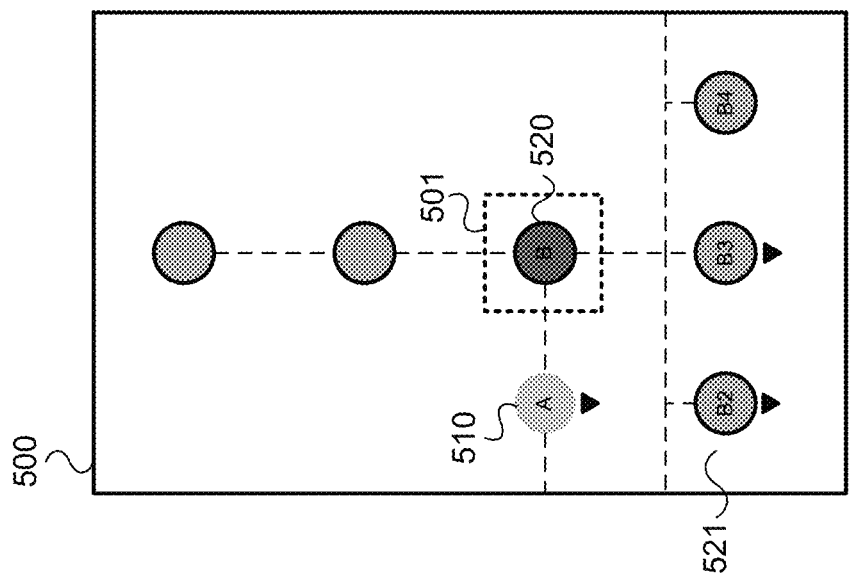
FIGS. 5A-5C depict example user interfaces as well as the operation of such user interfaces in accordance with one or more illustrative aspects discussed herein.
Figure 5B:
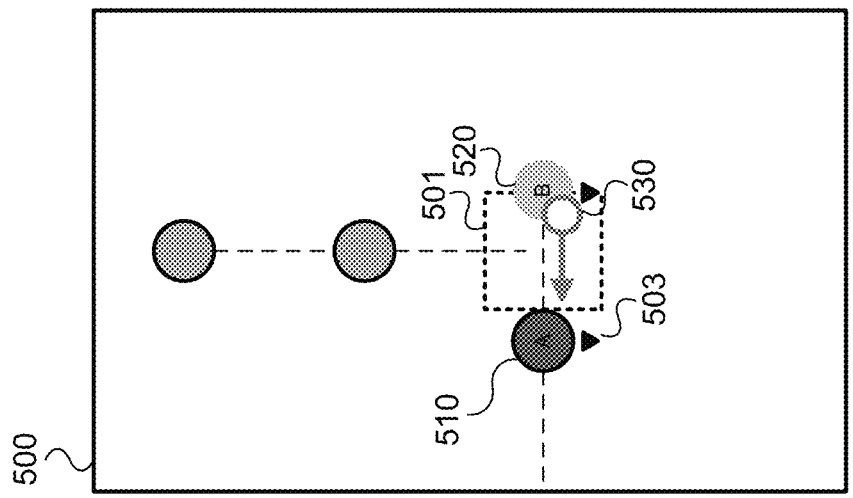
Figure 5A:
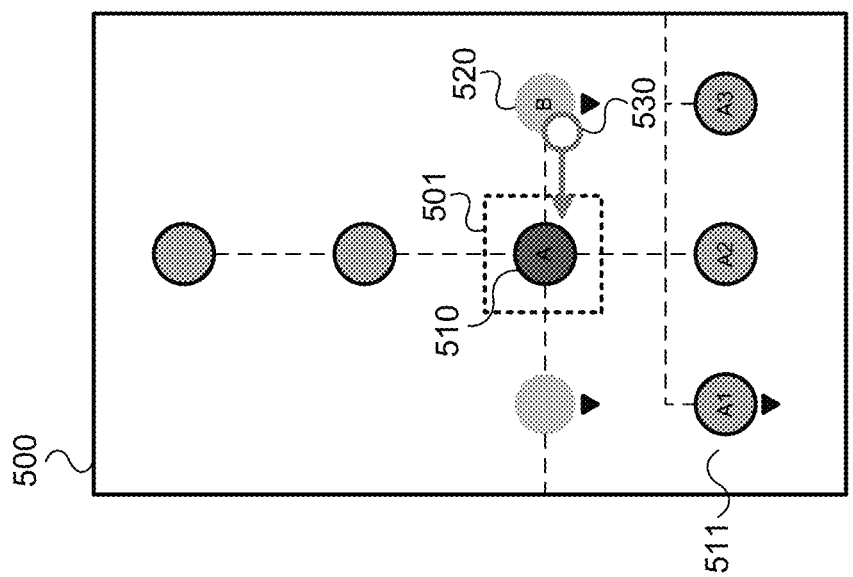

Having discussed a method for navigating throughout the visualization of the hierarchical data set as shown in FIG. 3, discussion will now turn to FIGS. 5A-5C which illustrate an example of how user interface 200 may operate according to aspects discussed above in regard to FIG. 3.

FIG. 5A illustrates an example user interface 500 having node A 510 as the focused node located at fixed focal point 501. Also included on user interface 500 are multiple other nodes related to node A 510. For example, the related nodes may include a subset of children, siblings, parents, and grandparents associated with node 510. The computing device may determine the related nodes based on relationships between elements of the hierarchical data set represented by node A 510 and the other nodes. Among the nodes included in user interface 500 are children nodes 511, shown labeled as A1, A2, and A3. Node A 510 as illustrated may have additional children as indicated by the child branch extending off-screen to the right side of user interface 500. Also included among the nodes of user interface 500 is node B 520, which represents an element having a sibling relationship (common parent) to node A 510.

As discussed above in regard to step 310 of FIG. 3, the computing device may receive user input to navigate to node B 520, such as scrolling input 530. In some embodiments, scrolling input 530 may correspond to a user tapping on the screen and dragging his finger in a leftward direction. The user may tap on node B 520, around node B 520 (such as within a threshold diameter), on the same level as node B 520, or on any portion of user interface 200 designated for performing the scrolling action. For instance, in one embodiment a user tap within the level of the hierarchy represented by children nodes 511 might not be operative to navigate to node B 520, but a tap within the level of a parent of 510 may be so operative.

In FIG. 5B, as a result of scrolling input 530, node B 520 has been moved such that it partially overlaps fixed focal point 501. Node A 510 has been moved out of fixed focal point as a result of scrolling input 530. In some embodiments, the computing device may update user interface 500 to remove the children nodes 511 shown in FIG. 5A from user interface 500 when scrolling input 530 is received. Children nodes 511 may be removed at the start of the input, when node A 510 exits the fixed focal point 501, when node B 520 at least partially overlaps fixed focal point 501, at the end of the input, or at any other suitable time. In some embodiments, the computing device may update user interface 500 to fade-out and/or otherwise transition children nodes 511 to remove them from user interface 500. In other embodiments, they may simply be removed. Additionally and/or alternatively, children nodes 511 may transition to an alternative and/or reduced representation, or may be replaced by a child node indicator 503. As also illustrated in FIG. 5B, common parents or other related nodes of node A 510 and node B 520 may remain displayed on user interface 500.

In FIG. 5C, node B 520 has been presented as the focused node within fixed focal point 501. The computing device may receive a selection of node B 520 as the focused node based on node B 520 partially overlapping fixed focal point 501. In some embodiments, the computing device may receive the selection upon detecting an end of scrolling input 530. In other embodiments, the selection of node B 520 as the focused node may be effected through a double tap or other direct selection of node B 520. User interface 500 may be updated (e.g., by the computing device) to display a subset of a second set of related nodes. The second set of related nodes may correspond to elements of the hierarchical data set having a relationship to the element represented by node B 520. As illustrated in FIG. 5C, for example, the subset of second related nodes may include node A 510 which is a sibling of node B 520. The subset may further include children nodes 521, shown labeled B2, B3, and B4. Node B 520 may have other children nodes, as indicated by the branches extending in both directions off-screen of user interface 500.

In some embodiments, children nodes 511 may fade-out at the beginning of scrolling input 530 and children nodes 521 may fade-in at the termination of scrolling input 530. The computing device may determine that scrolling input 530 has terminated based on a timer or based on the user removing his finger or otherwise ceasing scrolling input 530. By fading in children nodes 521, in some embodiments, techniques disclosed herein may provide a computing device with sufficient time to children nodes 521 in order to maintain a smooth appearance of user interface 500.

Figure 6:
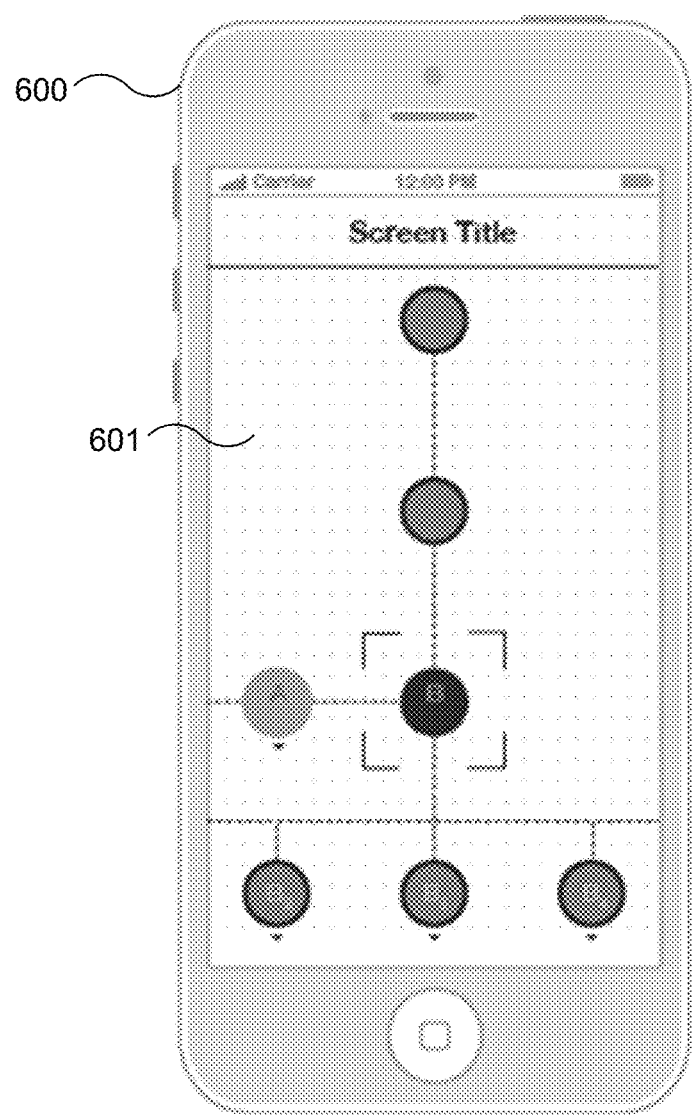
FIG. 6 depicts an example of a computing device presenting a user interface in accordance with one or more illustrative aspects discussed herein.

FIGS. 2, 4A-4C, and 5A-5C each illustrate examples of user interfaces 200 and 500 which may be used to navigate throughout a visualization of a hierarchical data set. As discussed above, computing device 100 may generate the user interface. The user interface may be presented to a user through input/output interface 135 (FIG. 1), such as through a display attached to or incorporated in computing device 100. FIG. 6 provides an example of a computing device, such as mobile device 600, presenting an example user interface 601 to a user. Mobile device 600 may be a smart phone and may run an operating system. User interface 601 may be adapted to support navigation by a user of mobile device 600, such as by mobile device 600 placing elements on the visualization to facilitate navigation using one hand. For example, mobile device 600 may generate user interface 601 to include fixed focal point at a location that generally corresponds to where a thumb of the user naturally rests during use of mobile device 600. As discussed above, this may be a lower third of a display region associated with user interface 601.

Further, in some embodiments mobile device 600 may constrain a scrolling motion received as user input by interpreting and/or acting on the scrolling motion as if it were either a purely horizontal or vertical scroll command. Mobile device 600 may interpret ambiguous or imprecise user input, e.g. input generated by a thumb of the user on the touch screen, as corresponding to limited types of user input available. For example, a user who desires to move down a level in the hierarchical data set may drag his thumb across the touch screen in a downward direction. However, it may be difficult for the user to contact the touch screen in a purely downward motion using his thumb. Without the input constraints discussed above, for example, a computing device may navigate in a diagonal direction corresponding to the exact motion input by the user. This may result in a node other than that desired by the user being selected, or may result in no selection at all. Instead, by constraining user input as in some embodiments, mobile device 600 may more accurately provide a user with the desired results sought by user input as part of navigating of a hierarchical data set.

Figure 7B:
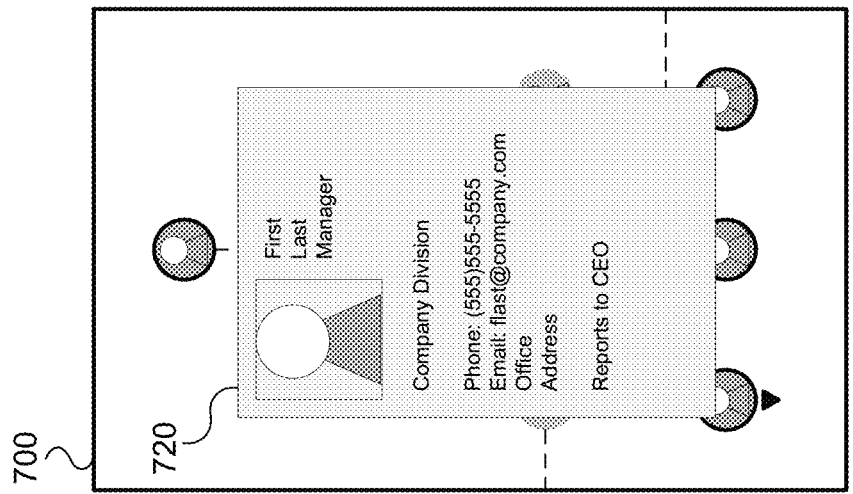
FIGS. 7A-7B depict example user interfaces that include representations of a hierarchical data set in accordance with one or more illustrative aspects discussed herein.
Figure 7A:
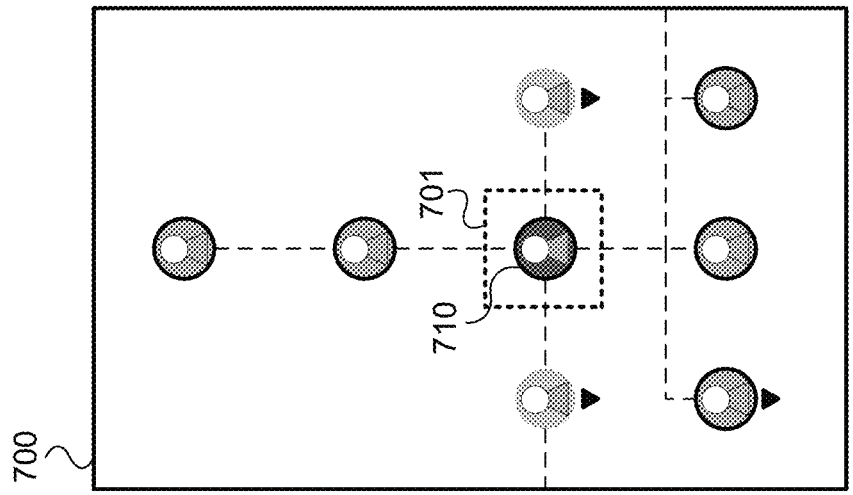
Figure 8:
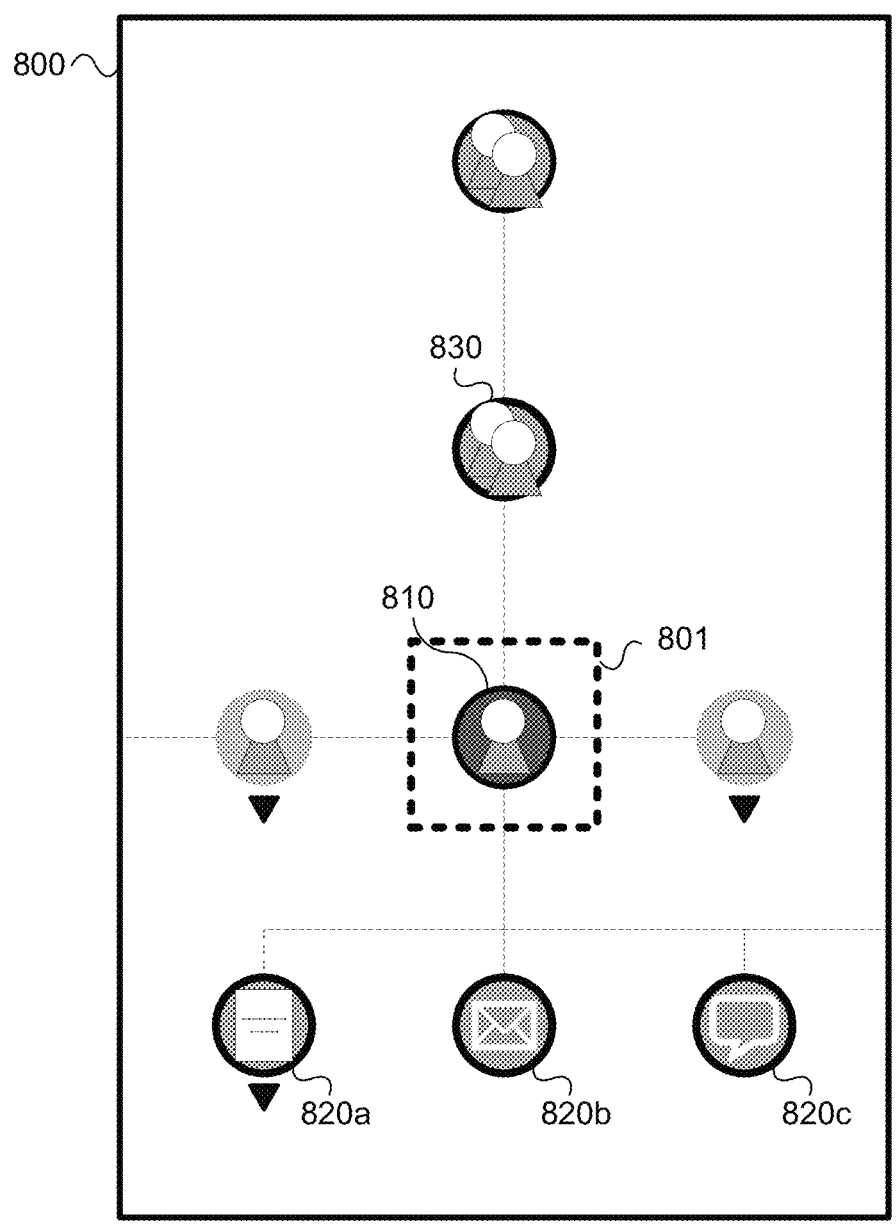
FIG. 8 depicts another example user interface that includes a representation of a hierarchical data set in accordance with one or more illustrative aspects discussed herein.

Having discussed a method for navigating throughout the visualization of the hierarchical data set as shown in FIG. 3 and an example of the user interface 500 in operation as shown in FIGS. 5A-5C, discussion will now turn to FIGS. 7A, 7B, and 8 which illustrate example applications of navigating throughout a visualization of a hierarchical data set.

FIGS. 7A and 7B depict example user interfaces that include representations of a hierarchical data set in accordance with one or more illustrative aspects discussed herein. As illustrated in FIGS. 7A and 7B, the hierarchical data set may be an organizational chart. As described above, the organizational chart may contain information regarding the structure of an organization and the relationships and/or relative ranks between positions or business units within the organization. Objects of user interface 700 generally correspond to those of user interface 200 but are adapted for the application of displaying an organizational chart. As can be seen in FIG. 7A, the computing device may generate user interface 700 to display each node as a node indicator with an image of a person represented by the node. In other embodiments, a first name, last name, job title, and the like may be displayed instead of or in addition to the node indicator and/or image. Each node displayed in user interface 700 may relate to focused node 710. For example, the nodes shown above focused node 710 may represent managers or other positions having a higher rank than the entity represented by focused node 710, or they may represent a chain of command or reporting as included in the organizational chart. Focused node 710 is so identified by its placement within fixed focal point 701, as described above.

In FIG. 7B, the computing device may provide contact information 720 regarding a node displayed on user interface 700. For example, contact information 720 may be related to focused node 710. The computing device may present contact information 720 in response to user input requesting the same, such as through operation of a key or a single tap on focused node 710, or the like. Contact information 720 may, as another example, be related to a different node of user interface 700. Contact information of the different node may be presented in response to receiving user input requesting the same, such as through a single tap on the desired node, or the like. Items displayed in contact information 720 may be operative to provide a user with quick access to desired functions. For example, in some embodiments a user may tap on a phone number contained in contact information 720 as a shortcut to call that contact.

The computing device may provide user interface 700 as part of another application, such as a mail application. For example, a user of a mail application may wish to access a corporate directory in order to properly address an email to an appropriate supervisor. The user may operate a control of the mail application causing user interface 700 to be displayed. The computing device may allow the user to navigate to the appropriate node corresponding to the supervisor according to the techniques and methods disclosed herein. Through these techniques, a user may be better able to understand the structure of an organization and quickly locate a desired entity based on their role/rank and relationship to other entities of the organization, for example.

FIG. 8 provides another example of an application of some aspects disclosed herein. User interface 800 includes nodes representing elements of the hierarchical data set as well as additional nodes representing data items or functions associated with those elements. In some embodiments, user interface 800 may present a visualization of a hierarchical data set related to collections of people. As one example, the collection may include business units of an organization or mailing groups in a mail system. As another example, user interface 800 may present a file system directory structure. In the example illustrated in FIG. 8, focused node 810 may represent a person in a business unit. Parent node 830 may represent an immediate business unit to which the person belongs, and that business unit itself may be part of another business unit. Focused node 810 may have sibling nodes which may represent other members of the business unit. User interface 800 may include functional nodes 820a, 820b, and 820c which may represent data items or functions associated with focused node 810. That is, user interface 800 may present a visualization of a mixed data set including the hierarchical data set and associated files or functions. For example, node 820a may represent one or more files associated with focused node 810. In response to receiving user input tapping on or otherwise operating node 820a, the computing device may display or otherwise interact with one or more files associated with focused node 810. Further, receiving user input operating node 820b may cause the computing device to generate an email to an email address associated with focused node 810. Similarly, receiving user input operating node 820c may cause the computing device to initiate a chat session with a person associated with focused node 810.

As discussed above, numerous other applications are contemplated for the methods of navigating a hierarchical data set disclosed herein. For example, the user interface may present a visualization of a hierarchical data set related to a file directory system where subfolders or files in a folder are children of that folder. Similarly, the visualization may be of a hierarchical workspace. Or, as another example, an element of a hierarchical data set may correspond to a particular task in a workflow and children of that element may be steps or component tasks of the particular task. In still other embodiments, the hierarchical data set may store information regarding containers or labels and the membership thereof. For example, the hierarchical data set may be a categorized directory of products or may be a taxonomy of items, or the hierarchical data set may represent a multiple taxonomy of items wherein an item may have more than one parent. Hierarchical data sets may be used to represent any type of data elements having parent-child or similar relationships, and aspects discussed herein may be utilized in any such application.

As illustrated above, various aspects of the disclosure relate to navigating a hierarchical data set, particularly through provision of a user interface with a fixed focal point. Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:
1. A method comprising:
generating, by a touch-enabled mobile computing device, a user interface having a fixed focal point region and a content region comprising a plurality of grid points, the content region configured to display a first plurality of nodes representing a portion of a hierarchical data set, wherein the first plurality of nodes comprises:
a first node representing a first element of the hierarchical data set,
one or more sibling nodes representing elements of the hierarchical data set having a sibling relationship to the first element,
one or more child nodes representing elements of the hierarchical data set having a child relationship to the first element,
a parent node representing an element of the hierarchical data set having a parent relationship to the first element, and
a grandparent node representing an element of the hierarchical data set having a grandparent relationship to the first element,
wherein the fixed focal point region is displaced from the center of the content region at a location accessible to a thumb of a user of the touch-enabled mobile computing device,
wherein the location of each node corresponds to a grid point of the plurality of grid points,
wherein any two horizontally adjacent nodes are separated by a first distance and any two vertically adjacent nodes are separated by a second distance, and wherein the fixed focal point region contains no more than a single complete node;
generating, by the touch-enabled mobile computing device, a first display of the user interface by:
updating the user interface to display the first node as a focused node at the fixed focal point region;
updating the user interface to display the one or more sibling nodes, wherein each sibling node is horizontally adjacent to the first node;
updating the user interface to display the one or more child nodes, wherein a child node is vertically adjacent to the first node, and each of the one or more child nodes is horizontally adjacent to at least one other child node;
updating the user interface to display the parent node, wherein the parent node is vertically adjacent to the first node and the grandparent node;
updating the user interface to display the grandparent node, wherein the grandparent node is vertically adjacent to the parent node; and
causing the first display of the user interface to be displayed, wherein the first display comprises: the first node as the focused node located at the fixed focal point region, the one or more sibling nodes, the one or more child nodes, the parent node, and the grandparent node;
receiving, by the touch-enabled mobile computing device, a first user input corresponding to a target child node of the one or more child nodes that is not vertically adjacent to the first node, the first user input comprising a motion that is interpreted, by the touch-enabled mobile computing device, as a horizontal scrolling motion operative to drag the target child node by the first distance such that the target child node is vertically adjacent to the first node;
generating, by the touch-enabled mobile computing device and in response to the dragging of the target child node such that the target child node is vertically adjacent to the first node, a second display of the user interface by:
removing, from the first plurality of nodes, a child node of the one or more child nodes,
adding, to the first plurality of nodes, a new child node representing an element of the hierarchical data set having a child relationship to the first element, and
causing the second display of the user interface to be displayed, wherein the second display comprises: the first node as the focused node located at the fixed focal point region, the one or more sibling nodes, the one or more child nodes, the parent node, and the grandparent node;
receiving, by the touch-enabled mobile computing device, a second user input corresponding to the target child node, the second user input comprising a motion that is interpreted, by the touch-enabled mobile computing device, as a vertical scrolling motion operative to drag the target child node by the second distance such that it overlaps the fixed focal point region;
determining, based on the target child node overlapping the fixed focal point region, that the target child node is selected as the focused node;
generating, by the touch-enabled mobile computing device and in response to determining that the target child node is selected as the focused node, a third display of the user interface by:
generating a second plurality of nodes comprising:
the target child node as a first node of the second plurality of nodes,
one or more child nodes representing elements of the hierarchical data set having a child relationship to the element of the hierarchical data set represented by the target child node,
the child nodes of the first plurality of nodes that are different from the target child node as sibling nodes of the second plurality of nodes,
the first node of the first plurality of nodes as a parent node of the second plurality of nodes, and
the parent node of the first plurality of nodes as a grandparent node of the second plurality of nodes; and
causing the third display of the user interface to be displayed, wherein the third display comprises: the first node of the second plurality of nodes as the focused node located at the fixed focal point region, the sibling nodes of the second plurality of nodes, the one or more child nodes of the second plurality of nodes, the parent node of the second plurality of nodes, and the grandparent node of the second plurality of nodes.

2. The method of claim 1,
wherein the fixed focal point region is maintained at a constant position fixed relative to the content region of the user interface as the target child node is dragged such that it overlaps the fixed focal point region.

3. The method of claim 1, further comprising:
receiving, by the touch-enabled mobile computing device, a third user input moving the first node of the second plurality of nodes vertically by the second distance away from the fixed focal point region; and
based on receiving the third user input, updating, by the touch-enabled mobile computing device, the user interface to add additional nodes representing elements of the hierarchical data set into the second plurality of nodes and to remove from display at least one node of the second plurality of nodes.

4. The method of claim 1, further comprising:
receiving a third user input navigating to the parent node as the focused node, wherein the third user input comprises a user finger maintaining contact with the parent node while performing a dragging motion operative to drag the parent node vertically by the second distance to overlap with the fixed focal point region.

5. The method of claim 1, further comprising:
determining, by the touch-enabled mobile computing device, that at least one node of the first plurality of nodes has one or more children; and
based on determining that the at least one node has the one or more children, updating, by the touch-enabled mobile computing device, the user interface to include at least one child indicator on the at least one node, wherein the at least one child indicator includes a visual display of the node with a link to an element of the hierarchical data set, and a visual display of a link to an unseen node in which the link extends to a left side boundary or a right side boundary of the user interface.

6. The method of claim 1, wherein an appearance of a particular node included in the user interface is determined according to content of an element of the hierarchical data set represented by the particular node.

7. The method of claim 1, wherein an appearance of a particular node included in the user interface is determined according to at least one of: data type, hierarchy level, or number of children.

8. The method of claim 1, wherein the hierarchical data set corresponds to an organizational chart representing information regarding the structure of an organization and the relationships and relative ranks between positions within the organization.

9. The method of claim 1, wherein the hierarchical data set corresponds to at least one of: a workflow or a directory structure.

10. The method of claim 1, further comprising:
updating, by the touch-enabled mobile computing device, the user interface to include one or more functional nodes, wherein the one or more functional nodes represent one or more functions associated with the focused node.

11. The method of claim 1, wherein the focused node corresponds to information comprising a name of a person, an email address of the person, and a telephone number of the person.

12. The method of claim 1, further comprising:
receiving, by the touch-enabled mobile computing device, a third user input corresponding to a child node, the third user input comprising a tapping gesture; and
in response to the receiving of the third user input, displaying one or more files associated with the focused node.

13. The method of claim 1, further comprising:
receiving, by the touch-enabled mobile computing device, a third user input corresponding to a child node, the third user input comprising a tapping gesture; and
in response to the receiving of the third user input, generating an email to an email address associated with the focused node.

14. The method of claim 1, further comprising:
receiving, by the touch-enabled mobile computing device, a third user input corresponding to a child node, the third user input comprising a tapping gesture; and
in response to the receiving of the third user input, initiating a chat session with a user associated with the focused node.

15. The method of claim 1, wherein the focused node corresponds to a person in a business unit and the parent node corresponds to a business unit to which the person belongs.

16. The method of claim 1, wherein the touch-enabled mobile computing device is a smart phone.

17. A system comprising:
a processor; and
memory storing computer-readable instructions that, when executed by the processor, cause the system to:
generate a user interface having a fixed focal point region and a content region comprising a plurality of grid points, the content region configured to display a first plurality of nodes representing a portion of a hierarchical data set,
wherein the first plurality of nodes comprises:
a first node representing a first element of the hierarchical data set,
one or more sibling nodes representing elements of the hierarchical data set having a sibling relationship to the first element,
one or more child nodes representing elements of the hierarchical data set having a child relationship to the first element,
a parent node representing an element of the hierarchical data set having a parent relationship to the first element, and
a grandparent node representing an element of the hierarchical data set having a grandparent relationship to the first element,
wherein the fixed focal point region is displaced from the center of the content region at a location accessible to a thumb of a user of the system,
wherein the location of each node corresponds to a grid point of the plurality of grid points,
wherein any two horizontally adjacent nodes are separated by a first distance and any two vertically adjacent nodes are separated by a second distance, and
wherein the fixed focal point region contains no more than a single complete node;
generate a first display of the user interface by causing the system to:
update the user interface to display the first node as a focused node at the fixed focal point region;
update the user interface to display the one or more sibling nodes, wherein each sibling node is horizontally adjacent to the first node;
update the user interface to display the one or more child nodes, wherein a child node is vertically adjacent to the first node, and each of the one or more child nodes is horizontally adjacent to at least one other child node;
update the user interface to display the parent node, wherein the parent node is vertically adjacent to the first node and the grandparent node;
update the user interface to display the grandparent node, wherein the grandparent node is vertically adjacent to the parent node; and
cause the first display of the user interface to be displayed, wherein the first display comprises: the first node as the focused node located at the fixed focal point region, the one or more sibling nodes, the one or more child nodes, the parent node, and the grandparent node;
receive a first user input
corresponding to a target child node of the one or more child nodes that is not vertically adjacent to the first node, the first user input
comprising a motion that is interpreted, by the system, as a horizontal scrolling motion operative to drag the target child node by the first distance such that the target child node is vertically adjacent to the first node;
generate, by the system and in response to the dragging of the target child node such that the target child node is vertically adjacent to the first node, a second display of the user interface by causing the system to:
remove, from the first plurality of nodes, a child node of the one or more child nodes,
add, to the first plurality of nodes, a new child node representing an element of the hierarchical data set having a child relationship to the first element, and
cause the second display of the user interface to be displayed, wherein the second display comprises: the first node as the focused node located at the fixed focal point region, the one or more sibling nodes, the one or more child nodes, the parent node, and the grandparent node;
receive, by the system, a second user input corresponding to the target child node, the second user input comprising
a motion that is interpreted, by the system, as a vertical scrolling motion operative to drag the target child node by the second distance such that it overlaps the fixed focal point region;

determine, based on the target child node partially overlapping the fixed focal point region, that the target child node is selected as the focused node;

generate, in response to determining that the target child node is selected as the focused node, a third display of the user interface by causing the system to:

generate a second plurality of nodes comprising:
    the target child node as a first node of the second plurality of nodes,
    one or more child nodes representing elements of the hierarchical data set having a child relationship to the element of the hierarchical data set represented by the target child node,
    the child nodes of the first plurality of nodes that are different from the target child node as sibling nodes of the second plurality of nodes,
    the first node of the first plurality of nodes as a parent node of the second plurality of nodes, and
    the parent node of the first plurality of nodes as a grandparent node of the second plurality of nodes;
  and
  cause the third display of the user interface to be displayed, wherein the third display comprises: the first node of the second plurality of nodes as the focused node located at the fixed focal point region, the sibling nodes of the second plurality of nodes, the one or more child nodes of the second plurality of nodes, the parent node of the second plurality of nodes, and the grandparent node of the second plurality of node.

18. The system of claim 17, wherein the focused node corresponds to contact information comprising a name of a person, an email address of the person, and a telephone number of the person.

19. One or more non-transitory computer-readable media having computer-executable instructions stored thereon that, when executed, cause a touch-enabled mobile computing device to:

generate a user interface having a fixed focal point region and a content region comprising a plurality of grid points, the content region configured to display a first plurality of nodes representing at least a portion of a hierarchical data set, wherein the fixed focal point region is fixed relative to the content region, and wherein the fixed focal point region contains no more than a single complete node;
  wherein the first plurality of nodes comprises:
    a first node representing a first element of the hierarchical data set,
    one or more sibling nodes representing elements of the hierarchical data set having a sibling relationship to the first element,
    one or more child nodes representing elements of the hierarchical data set having a child relationship to the first element,
    a parent node representing an element of the hierarchical data set having a parent relationship to the first element, and
    a grandparent node representing an element of the hierarchical data set having a grandparent relationship to the first element,
  wherein the fixed focal point region is displaced from the center of the content region at a location accessible to a thumb of a user of the touch-enabled mobile computing device,
  wherein the location of each node corresponds to a grid point of the plurality of grid points, and
  wherein any two horizontally adjacent nodes are separated by a first distance and any two vertically adjacent nodes are separated by a second distance;
  generate a first display of the user interface by causing the touch-enabled mobile computing device to:
    update the user interface to display the first node as a focused node at the fixed focal point region;
    update the user interface to display the one or more sibling nodes, wherein each sibling node is horizontally adjacent to the first node;
    update the user interface to display the one or more child nodes, wherein a child node is vertically adjacent to the first node, and each of the one or more child nodes is horizontally adjacent to at least one other child node;
    update the user interface to display the parent node, wherein the parent node is vertically adjacent to the first node and the grandparent node;
  update the user interface to display the grandparent node, wherein the grandparent node is vertically adjacent to the parent node; and
  cause the first display of the user interface to be displayed, wherein the first display comprises: the first node as the focused node located at the fixed focal point region, the one or more sibling nodes, the one or more child nodes, the parent node, and the grandparent node;
  receive a first user input corresponding to a target child node of the one or more child nodes that is not vertically adjacent to the first node, the first user input comprising a motion that is interpreted, by the touch-enabled mobile computing device, as a horizontal scrolling motion operative to drag the target child node by the first distance such that the target child node is vertically adjacent to the first node;
  generate, in response to the dragging of the target child node such that the target child node is vertically adjacent to the first node, a second display of the user interface by causing the touch-enabled mobile computing device to:
    remove, from the first plurality of nodes, a child node of the one or more child nodes,
    add, to the first plurality of nodes, a new child node representing an element of the hierarchical data set having a child relationship to the first element, and
  cause the second display of the user interface to be displayed, wherein the second display comprises: the first node as the focused node located at the fixed focal point region, the one or more sibling nodes, the one or more child nodes, the parent node, and the grandparent node;
  receive a second user input corresponding to the target child node, the second user input comprising
  a motion that is interpreted, by the touch-enabled mobile computing device, as a vertical scrolling motion operative to drag the target child node by the second distance such that it overlaps the fixed focal point region;
  determine, based on the target child node partially overlapping the fixed focal point region, that the target child node is selected as the focused node;
  generate, in response to determining that the target child node is selected as the focused node, a third display of the user interface by causing the touch-enabled mobile computing device to:

generate a second plurality of nodes comprising:
- the target child node as a first node of the second plurality of nodes,
- one or more child nodes representing elements of the hierarchical data set having a child relationship to the element of the hierarchical data set represented by the target child node,
- the child nodes of the first plurality of nodes that are different from the target child node as sibling nodes of the second plurality of nodes,
- the first node of the first plurality of nodes as a parent node of the second plurality of nodes, and
- the parent node of the first plurality of nodes as a grandparent node of the second plurality of nodes; and cause the third display of the user interface to be displayed, wherein the third display comprises: the first node of the second plurality of nodes as the focused node located at the fixed focal point region, the sibling nodes of the second plurality of nodes, the one or more child nodes of the second plurality of nodes, the parent node of the second plurality of nodes, and the grandparent node of the second plurality of nodes.

20. The non-transitory computer readable media of claim 19, wherein the touch-enabled mobile computing device is a smart phone.

21. The non-transitory computer readable media of claim 19, further comprising additional computer-executable instructions stored thereon that, when executed, cause a touch-enabled mobile computing device to:

receive a third user input corresponding to a child node, the third user input comprising a tapping gesture; and
display, in response to the receiving of the third user input, one or more files associated with the focused node.

* * * * *